(12) United States Patent
Hotta et al.

(10) Patent No.: US 11,303,234 B2
(45) Date of Patent: *Apr. 12, 2022

(54) MOTOR CONTROL DEVICE

(71) Applicant: SANDEN AUTOMOTIVE COMPONENTS CORPORATION, Isesaki (JP)

(72) Inventors: Masafumi Hotta, Isesaki (JP); Daisuke Hirono, Isesaki (JP)

(73) Assignee: SANDEN AUTOMOTIVE COMPONENTS CORPORATION, Isesaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/969,807

(22) PCT Filed: Jan. 21, 2019

(86) PCT No.: PCT/JP2019/002602
§ 371 (c)(1),
(2) Date: Aug. 13, 2020

(87) PCT Pub. No.: WO2019/167503
PCT Pub. Date: Sep. 6, 2019

(65) Prior Publication Data
US 2020/0373862 A1  Nov. 26, 2020

(30) Foreign Application Priority Data
Feb. 28, 2018  (JP) .............................. JP2018-035436

(51) Int. Cl.
H02P 6/18  (2016.01)

(52) U.S. Cl.
CPC .................................. H02P 6/181 (2013.01)

(58) Field of Classification Search
CPC ...... H02P 6/181; H02P 21/0021; H02P 21/26; H02P 6/182
See application file for complete search history.

(56) References Cited

U.S. PATENT DOCUMENTS 4,628,237 A * 12/1986 Vodinh ...................... H02P 7/03
                                                    318/266
5,734,243 A *  3/1998 Pabla ...................... B60S 1/482
                                                    318/443
(Continued)

FOREIGN PATENT DOCUMENTS

| JP | 2009-290980 A | 12/2009 |
| JP | 2012-228127 A | 11/2012 |
| JP | 2017-169329 A |  9/2017 |

OTHER PUBLICATIONS

Japan Patent Office; International Search Report issued in International Patent Application No. PCT/JP2019/002602, dated Mar. 26, 2019.

Primary Examiner — Muhammad S Islam
Assistant Examiner — Devon A Joseph
(74) Attorney, Agent, or Firm — Baker Botts L.L.P.

(57) ABSTRACT

Provided is a motor control device having a function for determining a rotor position of a synchronous motor, without use of a sensor, the device prevents obtaining an erroneous rotor position, to enable stable control of the synchronous motor based on the rotor position in both the normal-control region and the flux-weakening-control region. The motor control device 1 includes: a first rotor position determining unit 19 that determines a rotor position of the synchronous motor 2 based on an induced voltage electrical angle, and a first induced voltage phase obtained from a current peak value and a difference between the induced voltage electrical angle and a current electrical angle; a second rotor position determining unit 20 that determines a (Continued)

rotor position of the synchronous motor 2 based on an induced voltage electrical angle, and a second induced voltage phase obtained from a flux linkage and a current peak value; and a selecting unit 21 that selects the first rotor position determining unit 19 or the second rotor position determining unit 20, based on a current peak value, and a first induced voltage phase or a second induced voltage phase.

6 Claims, 6 Drawing Sheets

(56) References Cited

U.S. PATENT DOCUMENTS

| | | | | |
|---|---|---|---|---|
| 8,258,736 B2* | 9/2012 | Patel | ........................ | B60L 3/06 |
| | | | | 318/400.33 |
| 9,093,931 B2* | 7/2015 | Shibuya | .................... | H02P 6/28 |
| 9,184,683 B2* | 11/2015 | Hirono | ...................... | H02P 6/18 |
| 10,775,209 B2* | 9/2020 | Lechner | ..................... | H02P 6/34 |
| 2010/0109589 A1* | 5/2010 | Harada | ................. | G05B 19/401 |
| | | | | 318/400.33 |
| 2010/0117572 A1* | 5/2010 | Harada | ................. | H02K 21/227 |
| | | | | 318/400.11 |
| 2011/0089876 A1* | 4/2011 | Patel | ......................... | B60L 3/06 |
| | | | | 318/400.33 |
| 2014/0049201 A1* | 2/2014 | Hirono | .................... | H02P 1/166 |
| | | | | 318/400.23 |
| 2014/0306638 A1* | 10/2014 | Wu | ......................... | H02P 21/20 |
| | | | | 318/504 |
| 2015/0185095 A1* | 7/2015 | Wu | ........................... | G01L 3/26 |
| | | | | 73/862.08 |
| 2015/0311845 A1* | 10/2015 | Nagata | .................... | H02P 21/26 |
| | | | | 318/400.02 |
| 2017/0088111 A1* | 3/2017 | Kirchner | ................. | F16D 66/00 |
| 2018/0045035 A1* | 2/2018 | Logan | ..................... | E21B 47/20 |
| 2019/0074781 A1* | 3/2019 | Tsukamoto | ............. | H02P 6/182 |

\* cited by examiner

MOTOR CONTROL DEVICE

CROSS-REFERENCE TO RELATED APPLICATIONS

This application is a U.S. National Stage Patent Application under 35 U. S. C. § 371 of International Patent Application No. PCT/JP2019/002602, filed on Jan. 21, 2019, which claims the benefit of Japanese Patent Application No. 2018-035436, filed on Feb. 28, 2018, the disclosures of each of which are incorporated herein by reference in their entirety.

TECHNICAL FIELD

The present invention relates to motor control devices having functions for determining rotational positions of rotors (hereinafter, simply referred to as "rotor positions") of synchronous motors, without the use of sensors.

BACKGROUND ART

As an example of such a motor control device, a motor control device disclosed in Patent Document 1 is known. The motor control device disclosed in Patent Document 1 includes: a current-peak-value-and-electrical-angle determining unit that detects a current peak value and a current electrical angle based on a current flowing through a stator coil of a synchronous motor; an induced-voltage-peak-value-and-electrical-angle determining unit that determines an induced voltage peak value and induced voltage electrical angle based on the current flowing through the stator coil and a voltage applied to the stator coil; a flux linkage determining unit that determines a flux linkage of a rotor of the synchronous motor based on the induced voltage peak value and a rotational speed of the synchronous motor; a first rotor position determining unit and a second rotor position determining unit that determine a rotor position of the synchronous motor; and a selecting unit that selects one of the first rotor position determining unit and the second rotor position determining unit.

The first rotor position determining unit determines the rotor position by using a first rotor position calculation equation with, as parameters, the current electrical angle or the induced voltage electrical angle, and a first current phase or a first induced voltage phase obtained based on the current peak value and [(induced voltage electrical angle)−(current electrical angle)]. The second rotor position determining unit determines the rotor position by using a second rotor position calculation equation with, as parameters, the current electrical angle or the induced voltage electrical angle, and a second electrical phase or a second induced voltage phase obtained based on the current peak value and the flux linkage. The selecting unit selects the first rotor position determining unit in the normal-control region, and selects the second rotor position determining unit in the flux-weakening-control region. Specifically, the selecting unit selects the first rotor position determining unit when the current (current peak value) is less than or equal to a predetermined value, whereas the selecting unit selects the second rotor position determining unit when the current (current peak value) exceeds the predetermined value.

REFERENCE DOCUMENT LIST

Patent Document

Patent Document 1: JP 2017-169329 A

SUMMARY OF THE INVENTION

Problem to be Solved by the Invention

FIG. 10 is a diagram illustrating an example of the relationship between flux linkage $\Psi p$ and current phase $\beta$ in the conventional motor control device, when the current peak value is high. As shown in FIG. 10, when the current peak value is high, two current phases $\beta$ correspond to one flux linkage $\Psi p$ in an area indicated by arrow A. Furthermore, such a circumstance in the relationship between flux linkage $\Psi p$ and current phase $\beta$ also applies to the relationship between flux linkage $\Psi p$ and induced voltage phase $\gamma$, because induced voltage phase $\gamma$ corresponds to a value obtained by shifting current phase $\beta$ by [(induced voltage electrical angle)−(current electrical angle)]. These facts indicate that there may be a case in which current phase $\beta$ (i.e., second current phase) and induced voltage phase $\gamma$ (i.e., second induced voltage phase) cannot be stably obtained by the second rotor position determining unit, and ultimately, there may be a case in which the rotor position cannot be stably determined.

Thus, in the abovementioned conventional motor control device in which the second rotor position determining unit is selected only when the current (current peak value) exceeds the predetermined value, there is concern that an erroneous rotor position (including a rotor position in an undetectable state) may be obtained. The erroneous rotor position may make control of the synchronous motor unstable or make the synchronous motor uncontrollable. Thus, it is desired to prevent obtaining such an erroneous rotor position.

Therefore, an object of the present invention is to provide a motor control device that prevents obtaining an erroneous rotor position and enables stable control of the synchronous motor based on the rotor position in both the normal-control region and the flux-weakening-control region.

Means for Solving the Problem

According to one aspect of the present invention, a motor control device includes:

a current determining unit that determines a current flowing through a stator coil of a synchronous motor;

an applied voltage determining unit that determines an applied voltage applied to the stator coil;

a current-peak-value-and-electrical-angle determining unit that determines a current peak value and a current electrical angle based on a current determined by the current determining unit;

an induced-voltage-peak-value-and-electrical-angle determining unit that determines an induced voltage peak value and an induced voltage electrical angle based on the current determined by the current determining unit and an applied voltage determined by the applied voltage determining unit;

a flux linkage determining unit that determines a flux linkage of a rotor of the synchronous motor based on the induced voltage peak value and a rotational speed of the synchronous motor;

a first rotor position determining unit that determines a rotor position of the synchronous motor based on the induced voltage electrical angle, and a first induced voltage phase obtained from the current peak value and a difference between the induced voltage electrical angle and the current electrical angle;

a second rotor position determining unit that determines a rotor position of the synchronous motor based on the induced voltage electrical angle, and a second induced voltage phase obtained from the flux linkage and the current peak value; and a selecting unit that selects the first rotor position determining unit or the second rotor position determining unit, based on the current peak value, and the first induced voltage phase or the second induced voltage phase.

Effects of the Invention

In the motor control device, the selecting unit is configured to select the first rotor position determining unit or the second rotor position determining unit, based on the current peak value, and the first induced voltage phase or the second induced voltage phase. That is, the selecting unit selects the first rotor position determining unit or the second rotor position determining unit, considering not only the amount of current, but also the phase of induced voltage. This allows the selecting unit to appropriately select the first rotor position determining unit or the second rotor position determining unit, and more specifically, this allows switching from the first rotor position determining unit to the second rotor position determining unit, or switching from the second rotor position determining unit to the first rotor position determining unit, to be appropriately performed, so that it is possible to prevent obtaining an erroneous rotor position. This provides a stable and accurate determination of rotor position in both the normal-control region and the flux-weakening-control region, so that it is possible to stably control the synchronous motor.

MODE FOR CARRYING OUT THE INVENTION

Hereinbelow, an embodiment of the present invention will be described with reference to the accompanying drawings.

Figure 1:
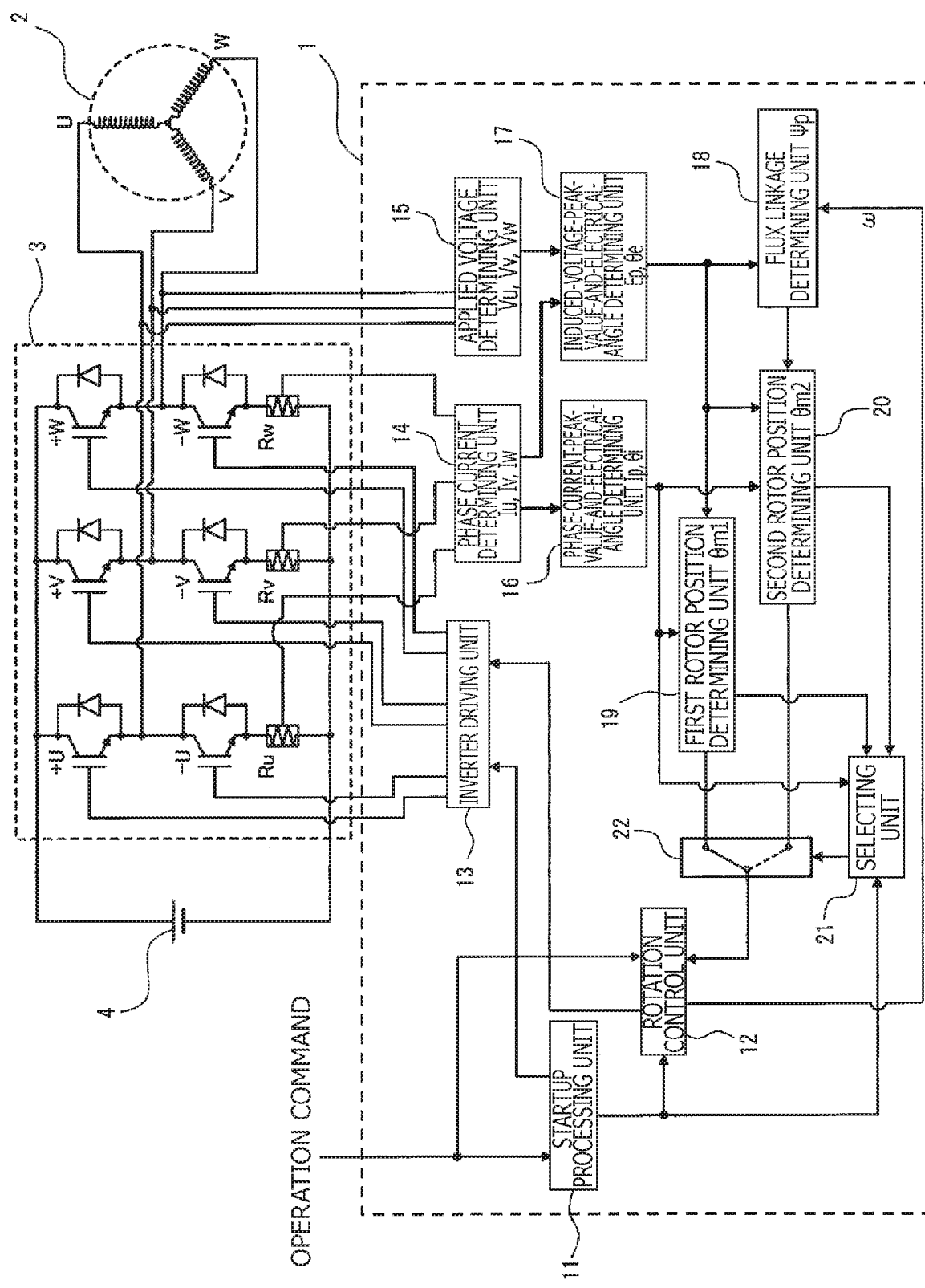
FIG. 1 is a block diagram of a motor control device according to an embodiment of the present invention.

FIG. 1 is a block diagram of a motor control device according to an embodiment of the present invention. A motor control device 1 according to an embodiment has a function for determining a rotor position of a synchronous motor 2, without the use of a sensor. Furthermore, the motor control device 1 is mainly configured to control an inverter 3, and the inverter 3 is configured to convert direct-current power from a direct-current power supply 4 into alternating-current power, to supply the converted power to the synchronous motor 2.

The synchronous motor 2 is a three-phase star connected motor having a stator including U-, V-, and W-phase stator coils, and a rotor including a permanent magnet. Only U-, V-, and W-phase stator coils are shown in the figures, and the remainder is not shown. Although a star-connected motor is illustrated as an example, a delta connection may be equally applicable.

In the inverter 3, upper arm switching elements +U, +V, +W and lower arm switching elements −U, −V, −W are connected in series between the high-level side and the low-level side of the direct-current power supply 4 in each of the U-, V-, and W-phases. On the low-level side of the lower arm switching elements −U, −V, −W, shunt resistors Ru, Rv, Rw for determining current flowing through each phase are provided.

The motor control device 1 includes a startup processing unit 11, a rotation control unit 12, an inverter driving unit 13, a phase current determining unit (current determining unit) 14, an applied voltage determining unit 15, a phase-current-peak-value-and-electrical-angle determining unit (current-peak-value-and-electrical-angle determining unit) 16, an induced-voltage-peak-value- and-electrical-angle determining unit 17, a flux linkage determining unit 18, a first rotor position determining unit 19, a second rotor position determining unit 20, and a selecting unit 21. In the present embodiment, each process, described later, executed in the rotation control unit 12, the phase current determining unit 14, the applied voltage determining unit 15, the phase-current-peak-value-and-electrical-angle determining unit 16, the induced-voltage-peak-value-and-electrical-angle determining unit 17, and the flux linkage determining unit 18, is repeated at predetermined time intervals.

The startup processing unit 11 executes a startup process of the synchronous motor 2 when receiving an operation command, including a target rotational speed, from the exterior while the synchronous motor 2 is stopped. In the present embodiment, the startup processing unit 11 activates the synchronous motor 2, and outputs a first control signal for gradually increasing rotational speed ω at a predetermined acceleration to the inverter driving unit 13. The first control signal includes a startup voltage instruction and a startup voltage phase instruction. Then, for example, the startup processing unit 11 determines that the startup is completed when rotational speed ω of the synchronous motor 2 reaches a predetermined rotational speed that is lower than the target rotational speed, and the startup processing unit 11 outputs a startup completion signal to the rotation control unit 12 and the selecting unit 21, to end the startup process.

When receiving the startup completion signal output from the startup processing unit 11, the rotation control unit 12 executes normal control. Thereby, the starting process is shifted to the normal control. In the present embodiment, the rotation control unit 12 generates a second control signal for rotating the synchronous motor 2 at the target rotational speed based on the operation command, received from the exterior, and rotor position θm, and outputs the second control signal to the inverter driving unit 13. The second control signal includes a voltage instruction and a voltage phase instruction. Furthermore, as described later, rotor position θm is rotor position θm determined by the first rotor position determining unit 19 (i.e., first rotor position θm1), or is rotor position θm determined by the second rotor position determining unit 20 (i.e., second rotor position θm2). Furthermore, when receiving an operation stop command from the exterior, the rotation control unit 12 stops outputting the second control signal, to stop the synchronous motor 2.

The inverter driving unit 13 drives each of the switching elements +U to −W of the inverter 3 to be turned on and off based on the first control signal from the startup processing unit 11 or the second control signal from the rotation control unit 12, to perform sine wave energization (180-degree energization) to each of U-, V-, and W-phase stator coils.

The phase current determining unit 14 determines U-phase current Iu flowing through the U-phase stator coil, V-phase current Iv flowing through the V-phase stator coil, and W-phase current Iw flowing through the W-phase stator coil by measuring voltage applied to the shunt resistors Ru, Rv, Rw.

The applied voltage determining unit 15 determines U-phase applied voltage Vu, V-phase applied voltage Vv, and W-phase applied voltage Vw, applied to the corresponding U-, V-, and W-phase stator coils from the corresponding upper arm switching elements +U to +W. The phase-current-peak-value-and-electrical-angle determining unit 16 determines phase current peak value Ip and phase current electrical angle θi based on phase currents Iu, Iv, Iw determined by the phase current determining unit 14. A determining method of phase current peak value Ip and phase current electrical angle θi is as follows.

Figure 2:
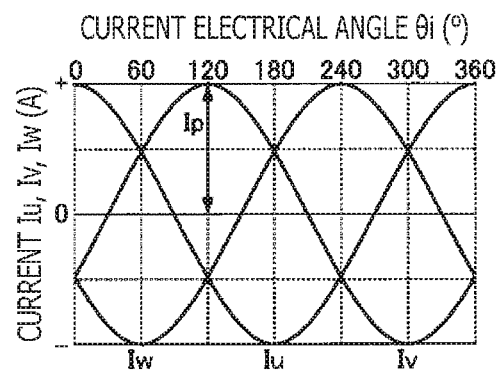
FIG. 2 is a phase current waveform diagram when sine wave energization is performed.

FIG. 2 is a phase current waveform diagram when sine wave energization is performed to the U-, V-, and W-phases. Phase differences among U-, V-, and W-phase currents Iu, Iv, Iw, each forming a sine waveform, are 120°. Referring to FIG. 2, the following Equations 1 hold among phase currents Iu, Iv, Iw, phase current peak value Ip, and phase current electrical angle θi. The phase-current-peak-value-and-electrical-angle determining unit 16 obtains phase current peak value Ip and phase current electrical angle θi by the following Equations 1, based on U-, V-, and W-phase currents Iu, Iv, Iw determined by the phase current determining unit 14.

$$Iu = Ip \times \cos(\theta i)$$

$$Iv = Ip \times \cos(\theta i - \tfrac{2}{3}\pi)$$

$$Iw = Ip \times \cos(\theta i + \tfrac{2}{3}\pi) \qquad \text{Equations 1}$$

The induced-voltage-peak-value-and-electrical-angle determining unit 17 determines induced voltage peak value Ep and induced voltage electrical angle θe based on phase currents Iu, Iv, Iw, determined by the phase current determining unit 14, and applied voltages Vu, Vv, Vw, determined by the applied voltage determining unit 15. A determining method of induced voltage peak value Ep and induced voltage electrical angle θe is as follows.

Figure 3:
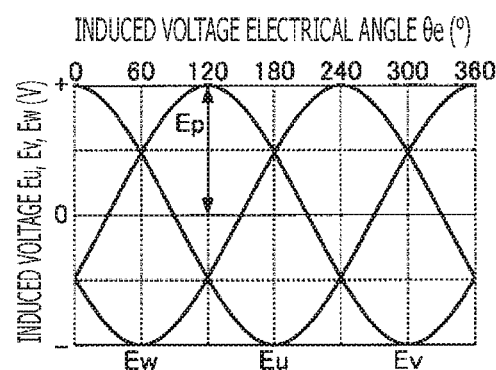
FIG. 3 is an induced voltage waveform diagram when sine wave energization is performed.

FIG. 3 is an induced voltage waveform diagram when sine wave energization is performed to the U-, V-, and W-phases. Phase differences among U-, V-, and W-phase induced voltages Eu, Ev, Ew, each forming a sine waveform, are 120°. Referring to FIG. 3, the following Equations 2 hold among induced voltages Eu, Ev, Ew, induced voltage peak value Ep, and induced voltage electrical angle θe.

$$Eu = Ep \times \cos(\theta e)$$

$$Ev = Ep \times \cos(\theta e - \tfrac{2}{3}\pi)$$

$$Ew = Ep \times \cos(\theta e + \tfrac{2}{3}\pi) \qquad \text{Equations 2}$$

On the other hand, the following Equations 3 hold among applied voltages Vu, Vv, Vw, phase currents Iu, Iv, Iw, resistances Rcu, Rcv, Rcw of the stator coils (known as motor parameters), and induced voltages Eu, Ev, Ew.

$$Vu - Iu \times Rcu = Eu$$

$$Vv - Iv \times Rcv = Ev$$

$$Vw - Iw \times Rcw = Ew \qquad \text{Equations 3}$$

The induced-voltage-peak-value-and-electrical-angle determining unit 17 obtains U-, V-, and W-phase induced voltages Eu, Ev, Ew by Equations 3 based on U-, V-, and W-phase currents Iu, Iv, Iw, determined by the phase current determining unit 14, and U-, V-, and W-phase applied voltages Vu, Vv, Vw, determined by the applied voltage determining unit 15, and then, obtains induced voltage peak value Ep and induced voltage electrical angle θe by Equations 2 based on the obtained U-, V-, and W-phase induced voltages Eu, Ev, Ew.

The flux linkage determining unit 18 determines flux linkage Ψp (=Ep/ω) of the rotor based on induced voltage peak value Ep, determined by the induced-voltage-peak-value-and-electrical-angle determining unit 17, and rotor rotational speed ω, received from the rotation control unit 12. Rotor rotational speed ω is determined (calculated) by the rotation control unit 12 by dθm/dt.

The first rotor position determining unit 19 determines rotor position θm based on phase current peak value Ip and phase current electrical angle θi, determined by the phase-current-peak-value-and-electrical-angle determining unit 16, and induced voltage electrical angle θe, determined by the induced-voltage-peak-value-and-electrical-angle determining unit 17. Specifically, the first rotor position determining unit 19 determines rotor position θm based on induced voltage electrical angle θe, and induced voltage phase γ that is obtained from phase current peak value Ip and a difference between induced voltage electrical angle θe and phase current electrical angle θi, [(induced voltage electrical angle θe)−(phase current electrical angle θi)]. Herein, rotor position θm determined by the first rotor position determining unit 19 is referred to as "first rotor position θm1", and induced voltage phase γ obtained from phase current peak value Ip and [(induced voltage electrical angle θe)−(phase current electrical angle θi)] is referred to as "first induced voltage phase γ1".

Specifically, in the present embodiment, the first rotor position determining unit 19 determines first rotor position θm1 by using a first rotor position calculation equation (Equation 4, described below) with, as parameters, induced voltage electrical angle θe, and first induced voltage phase γ1 obtained from phase current peak value Ip and [(induced voltage electrical angle θe)−(phase current electrical angle θi)].

(First rotor position θm1)=(induced voltage electrical angle θe)−(first induced voltage phase γ1)−90°    Equation 4

First induced voltage phase γ1 in Equation 4 is selected by referring to a data table TA. The data table TA is generated in advance and includes phase current peak value Ip and [(induced voltage electrical angle θe)−(phase current electrical angle θi)], as parameters. For example, the data table TA may be generated as follows, and stored in a memory.

Figure 4:
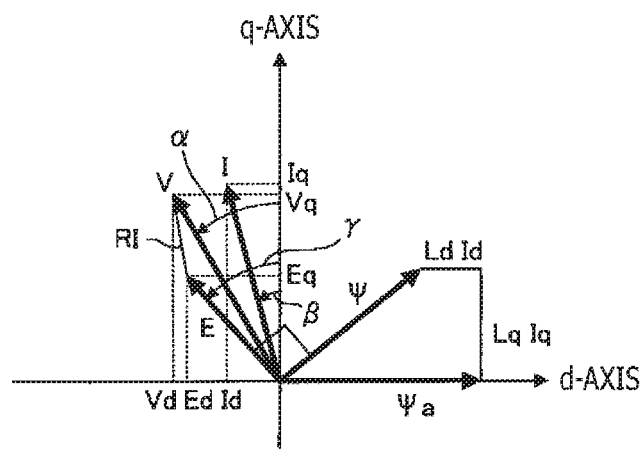
FIG. 4 is a motor vector diagram of a rotor coordinate system (d-q coordinate system).

FIG. 4 is a motor vector diagram when the rotor of the synchronous motor 2 is rotating. The diagram illustrates the relationships among applied voltage V (Vu to Vw), current I (Iu to Iw), and induced voltage E (Eu to Ew), expressed by vectors in d-q coordinate system. Induced voltage E is expressed by [ω$\Psi$]. In FIG. 4, Vd is a d-axis component of applied voltage V, Vq is a q-axis component of applied voltage V, Id is a d-axis component of current I, Iq is a q-axis component of current I, Ed is a d-axis component of induced voltage E, and Eq is a q-axis component of induced voltage E. A voltage phase with respect to the q-axis is α, a current phase with respect to the q-axis is β, and an induced voltage phase with respect to the q-axis is γ. In the diagram, $\Psi$a is a magnetic flux of a permanent magnet of the rotor, Ld is a d-axis inductance, Lq is a q-axis inductance, R is a resistance value of a stator coil (Rcu to Rcw), and $\Psi$ is a flux linkage of the rotor.

The following Equation 5 can be derived by referring to FIG. 4, and this can be rewritten as the following Equation 6 by transposing values regarding ω from the right-hand side to the left-hand side of Equation 5.

$$\begin{pmatrix} Vd \\ Vq \end{pmatrix} = \begin{pmatrix} R & -\omega Lq \\ \omega Ld & R \end{pmatrix} \begin{pmatrix} Id \\ Iq \end{pmatrix} + \begin{pmatrix} 0 \\ \omega\Psi a \end{pmatrix} \quad \text{Equation 5}$$

$$\begin{pmatrix} Ed/\omega = (Vd - Id \times R)/\omega \\ Eq/\omega = (Vq - Iq \times R)/\omega \end{pmatrix} = \begin{pmatrix} 0 & -Lq \\ Ld & 0 \end{pmatrix} \begin{pmatrix} Id \\ Iq \end{pmatrix} + \begin{pmatrix} 0 \\ \Psi a \end{pmatrix} \quad \text{Equation 6}$$

The data table TA is generated in advance based on the fact that Equation 5 and Equation 6 hold in the motor vector diagram of FIG. 4. That is, the data table TA of induced voltage phase γ (first induced voltage phase γ1), including phase current peak value Ip corresponding to current I, and [(induced voltage electrical angle θe)−(phase current electrical angle θi)] corresponding to [(induced voltage phase γ)−(current phase β)], as parameters, is generated by storing induced voltage phases γ at the time when [(induced voltage phase γ)−(current phase β)] becomes predetermined values while progressively increasing current phase β and current I, indicated in the motor vector diagram of FIG. 4, within predetermined ranges.

Specifically, for example, while increasing current phase β from −180° to 180° by 0.001° and increasing current I from 0 A to a maximum (here, 64 A) by 1 A, voltage phases α, current phases β, and induced voltage phases γ are obtained based on the motor vector diagram of FIG. 4, using intrinsic d- and q-axis inductances Ld, Lq of the synchronous motor 2. Then, induced voltage phases γ at the time when [(induced voltage phase γ)−(current phase β)] becomes 1°, 2°, 3°, . . . , are stored for each current I. Thereby generated is the data table TA of induced voltage phase γ (first induced voltage phase γ1), including phase current peak value Ip corresponding to current I as a parameter, and [(induced voltage electrical angle θe)−(phase current electrical angle θi)] corresponding to [(induced voltage phase γ)−(current phase (3)] as another parameter.

Then, the first rotor position determining unit 19 determines (calculates) first rotor position θm1 by inserting induced voltage electrical angle θe, and first induced voltage phase γ1 that is selected from the data table TA depending on phase current peak value Ip and [(induced voltage electrical angle θe)−(phase current electrical angle θi)], into the abovementioned first rotor position calculation equation (Equation 4).

The second rotor position determining unit 20 determines rotor position θm based on phase current peak value Ip, determined by the phase-current-peak-value-and-electrical-angle determining unit 16, induced voltage electrical angle θe, determined by the induced-voltage-peak-value-and-electrical-angle determining unit 17, and flux linkage $\Psi$p, determined by the flux linkage determining unit 18. Specifically, the second rotor position determining unit 20 determines rotor position θm based on induced voltage electrical angle θe, and induced voltage phase γ that is obtained from flux linkage $\Psi$p and phase current peak value Ip. Herein, rotor position θm determined by the second rotor position determining unit 20 is referred to as "second rotor position θm2", and induced voltage phase γ obtained from flux linkage $\Psi$p and phase current peak value Ip is referred to as "second induced voltage phase γ2".

Specifically, in the present embodiment, the second rotor position determining unit 20 determines second rotor position θm2 by using a second rotor position calculation equation (Equation 7, described below) with, as parameters, induced voltage electrical angle θe, and second induced voltage phase γ2 obtained from flux linkage $\Psi$p and phase current peak value Ip.

(Second rotor position θ*m*2)=(induced voltage electrical angle θ*e*)−(second induced voltage phase γ2)−90°     Equation 7

Second induced voltage phase γ2 in Equation 7 is selected by referring to a data table TB. The data table TB is generated in advanced and includes phase current peak value Ip and flux linkage $\Psi$p as parameters. For example, the data table TB may be generated as follows, and stored in advance in a memory.

Similarly to the data table TA, the data table TB is also generated in advance based on the fact that Equation 5 and Equation 6 hold in the motor vector diagram of FIG. 4. That is, the data table TB of induced voltage phase γ (second induced voltage phase γ2), including phase current peak value Ip corresponding to current I and flux linkage $\Psi$p determined by the flux linkage determining unit 18, corresponding to flux linkage $\Psi$, as parameters, is generated by storing induced voltage phases γ at the time when flux linkage $\Psi$ becomes predetermined values while progressively increasing current phase β and current I, indicated in the motor vector diagram of FIG. 4, within predetermined ranges.

Specifically, for example, while increasing current phase β from −180° to 180° by 0.001° and increasing current I from 0 A to a maximum (here, 64 A) by 1 A, induced voltage phases γ and flux linkages $\Psi$ are obtained. Then, induced voltage phase γ corresponding to each flux linkage $\Psi$ is stored for each current I. Thereby generated is the data table TB2 of induced voltage phase γ (second induced voltage phase γ2), including phase current peak value Ip corresponding to current I as a parameter, and flux linkage $\Psi$p corresponding to flux linkage $\Psi$ as another parameter.

Then, the second rotor position determining unit 20 determines (calculates) second rotor position θm2 by inserting induced voltage electrical angle θe, and second induced voltage phase γ2 that is selected from the data table TB depending on phase current peak value Ip and flux linkage $\Psi$p, into the abovementioned second rotor position calculation equation (Equation 7).

The selecting unit 21 selects the first rotor position determining unit 19 or the second rotor position determining unit 20 by appropriately controlling a switch 22. In the present embodiment, the selecting unit 21 is configured to select the first rotor position determining unit 19 or the second rotor position determining unit 20, based on phase current peak value Ip and induced voltage phase γ (first induced voltage phase γ1, second induced voltage phase γ2). When the first rotor position determining unit 19 is selected, first rotor position θm1 determined by the first rotor position determining unit 19 is input into the rotation control unit 12 as rotor position θm, whereas when the second rotor position determining unit 20 is selected, second rotor position θm2 determined by the second rotor position determining unit 20 is input into the rotation control unit 12 as rotor position θm. The reason for selecting the first rotor position determining unit 19 or the second rotor position determining unit 20 in this way by the selecting unit 21, is to stably obtain induced voltage phase γ, not only in the normal-control region, but also in the flux-weakening-control region in which flux weakening control is performed, and ultimately, to stably determine rotor position θm.

Next, a process for selecting the first rotor position determining unit 19 or the second rotor position determining unit 20 performed by the selecting unit 21 will be described.

Figure 5:
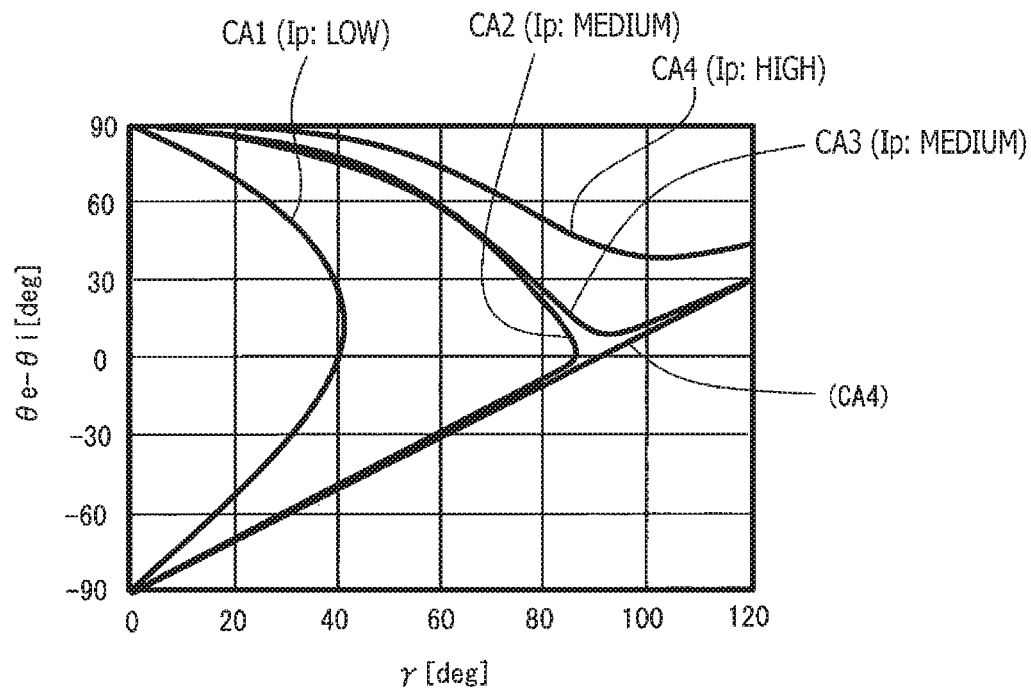
FIG. 5 is a diagram for explaining a data table used in a first rotor position determining unit, illustrating an example of the relationship between current phase β and [(induced voltage electrical angle θe)−(phase current electrical angle θi)].
Figure 6:
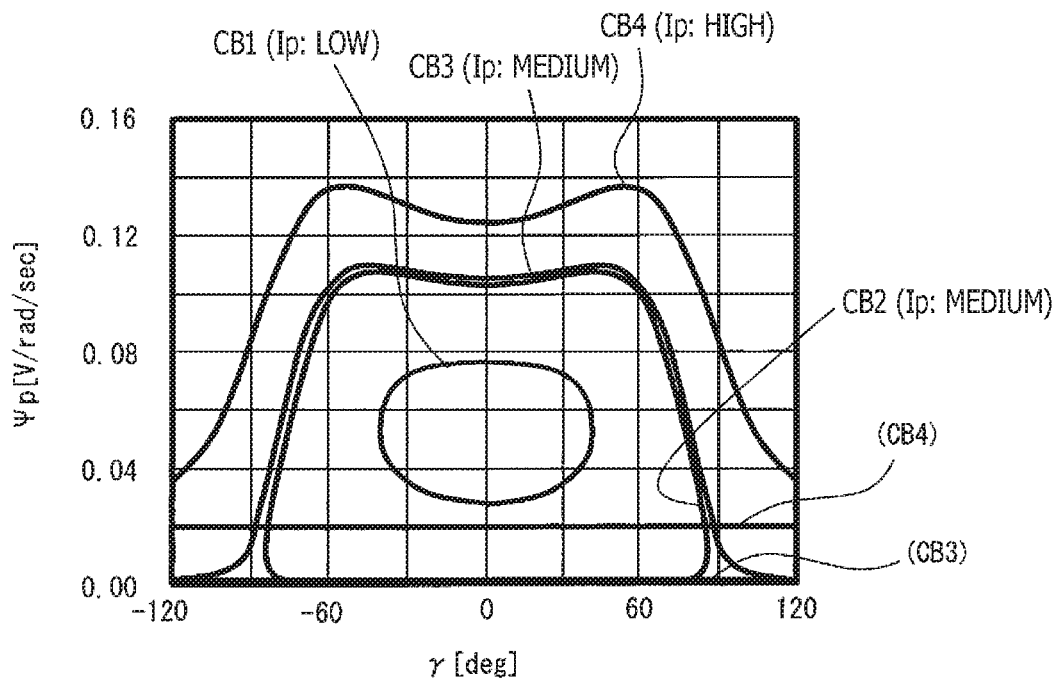
FIG. 6 is a diagram for explaining a data table used in a second rotor position determining unit, illustrating an example of the relationship between current phase β and flux linkage Ψp.

FIG. 5 is a diagram for explaining the data table TA used in the first rotor position determining unit 19, and illustrates an example of the relationship between induced voltage phase γ and [(induced voltage electrical angle θe)−(phase current electrical angle θi)]. FIG. 6 is a diagram for explaining the data table TB used in the second rotor position determining unit 20, and illustrates an example of the relationship between induced voltage phase γ and flux linkage Ψp.

In FIG. 5, curves CA1 to CA4, indicating the relationship between induced voltage phase γ and [(induced voltage electrical angle θe)−(phase current electrical angle θi)], correspond to a part of the data table TA, and, in FIG. 6, curves CB1 to CB4, indicating the relationship between induced voltage phase γ and flux linkage Ψp, correspond to a part of the data table TB. The curve CA1 in FIG. 5 and the curve CB1 in FIG. 6 indicate cases in which phase current peak value Ip is low (for example, Ip≤30 A). The curves CA2 and CA3 in FIG. 5 and curves CB2 and CB3 in FIG. 6 indicate cases in which phase current peak value Ip is medium (for example, 30<Ip≤50 A). The curve CA4 of FIG. 5 and the curve CB4 of FIG. 6 indicate cases in which phase current peak value Ip is high (for example, Ip>50 A).

Referring to FIG. 5, in the curve CA1 indicating the case in which phase current peak value Ip is low and the curve CA2 indicating the case in which phase current peak value Ip is medium, [(induced voltage electrical angle θe)−(phase current electrical angle θi)] corresponds to induced voltage phase γ one-to-one, so that it is possible to stably obtain induced voltage phase γ from [(induced voltage electrical angle θe)−(phase current electrical angle θi)]. However, each of the curve CA3 indicating the case in which phase current peak value Ip is medium, and the curve CA4 indicating the case in which phase current peak value Ip is high, has a point of change at which tendencies greatly change, in a region in which induced voltage phase γ exceeds a first predetermined value (85 degrees, in this case). Thus, there may be a case in which multiple induced voltage phases γ correspond to one [(induced voltage electrical angle θe)−(phase current electrical angle θi)], and accordingly, there is concern that induced voltage phase γ cannot be stably obtained from [(induced voltage electrical angle θe)−(phase current electrical angle θi)].

On the other hand, referring to FIG. 6, in each of the curve CB1 indicating the case in which phase current peak value Ip is low, the curves CB2 and CB3, indicating the case in which phase current peak value Ip is medium, and the curve CB4 indicating the case in which phase current peak value Ip is high, multiple induced voltage phases γ correspond to one flux linkage Ψp, and thus, it is difficult to stably obtain induced voltage phase γ from flux linkage Ψp. However, for example, if only a region in which induced voltage phase γ is greater than or equal to a second predetermined value (here, 55 degrees) is targeted, it is possible to stably obtain induced voltage phase γ corresponding to flux linkage Ψp by the curves CB2, CB3, and CB4.

That is, when phase current peak value Ip is low, it is possible to stably obtain induced voltage phase γ by using the curve CA1, and this ultimately makes it possible to stably determine rotor position θm. When phase current peak value Ip is medium or higher, it is possible to stably obtain induced voltage phase γ by using a first region of the curves CA2 to CA4, in which induced voltage phase γ is less than or equal to the first predetermined value (85 degrees), and a second region of the curves CB2 to CB4, in which induced voltage phase γ is equal to or greater than the second predetermined value (55 degrees), and this ultimately makes it possible to stably determine rotor position θm. Furthermore, as a switching point for switching between a case in which the curves CA2 to CA4 are used (i.e., the first rotor position determining unit 19 that uses the data table TA), and a case in which the curves CB2 to CB4 are used (i.e., the second rotor position determining unit 20 that uses the data table TB), a freely chosen induced voltage phase γ in a range from the second predetermined value (55 degrees) to the first predetermined value (85 degrees), which is a range in which the first region of the curves CA2 to CA4 and the second region of the curves CB2 to CB4 overlap, may be used.

Thus, in the present embodiment, it is configured so that the selecting unit 21 monitors phase current peak value Ip and induced voltage phase γ (first induced voltage phase γ1, second induced voltage phase γ2), and based on these values, the selecting unit 21 selects the first rotor position determining unit 19 or the second rotor position determining unit 20.

Figure 7:
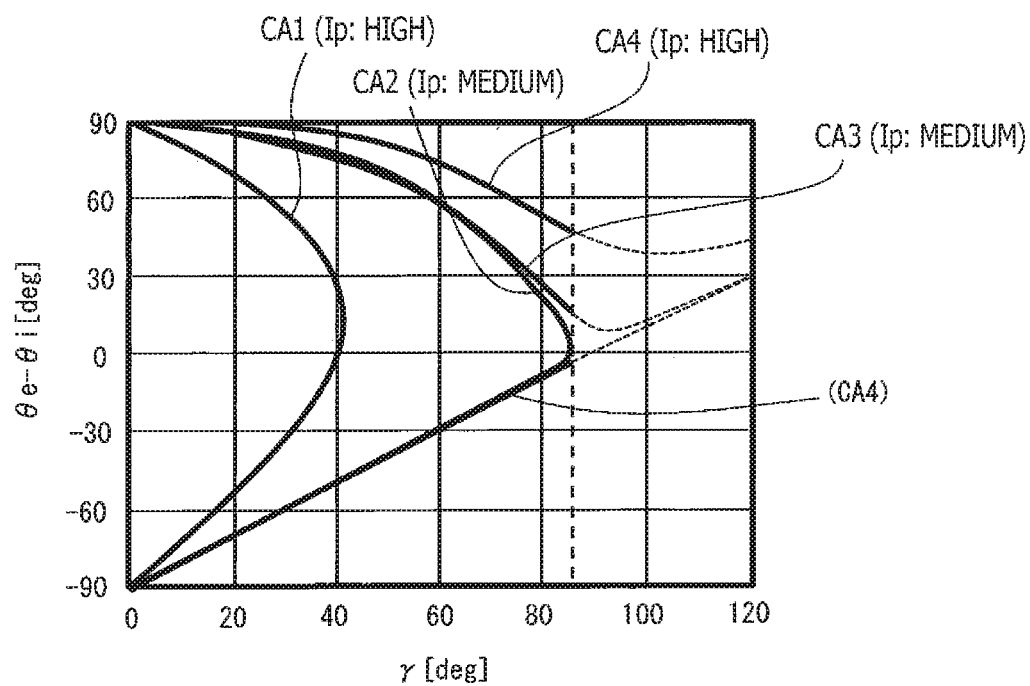
FIG. 7 is a diagram illustrating an example of the data table used in the first rotor position determining unit.
Figure 8:
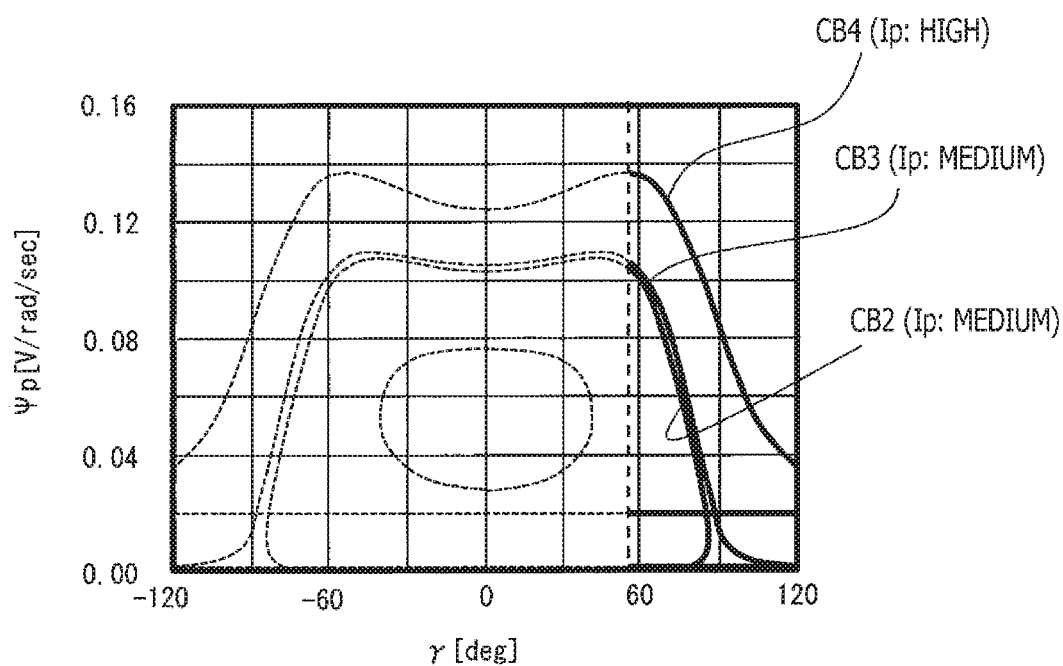
FIG. 8 is a diagram illustrating an example of the data table used in the second rotor position determining unit.

Preferably, as shown in FIG. 7, the data table TA that does not cover a region in which induced voltage phase γ exceeds the first predetermined value (85 degrees) when phase current peak value Ip is medium or high (broken line), is generated, and, as shown in FIG. 8, the data table TB that does not cover the case in which phase voltage peak value Ip is low (broken line) and a region in which induced current phase γ is less than the second predetermined value (55 degrees) when phase current peak value Ip is medium or high (broken line), is generated, and then, the selecting unit 21 executes the process for selecting the first rotor position determining unit 19 or the second rotor position determining unit 20, as described later.

Figure 9:
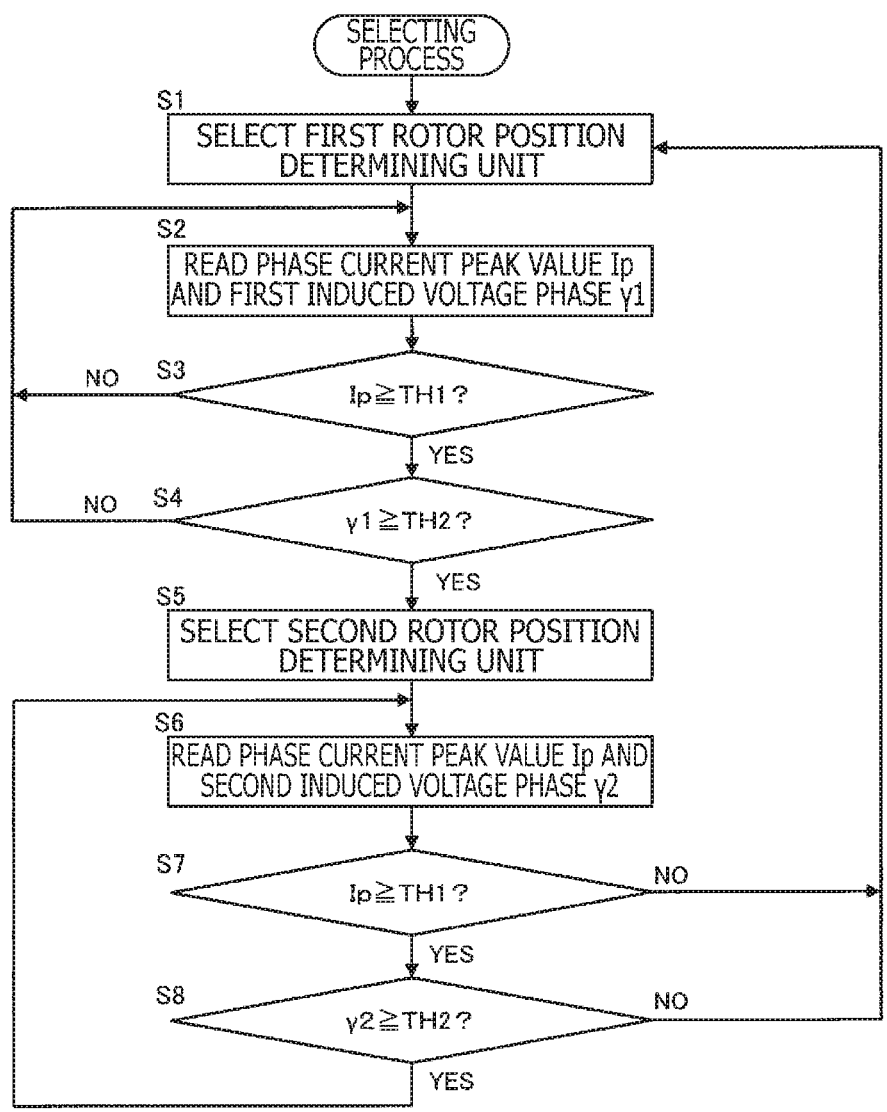
FIG. 9 is a flowchart illustrating an example of a process for selecting the first rotor position determining unit or the second rotor position determining unit, executed by a selecting unit.
Figure 10:
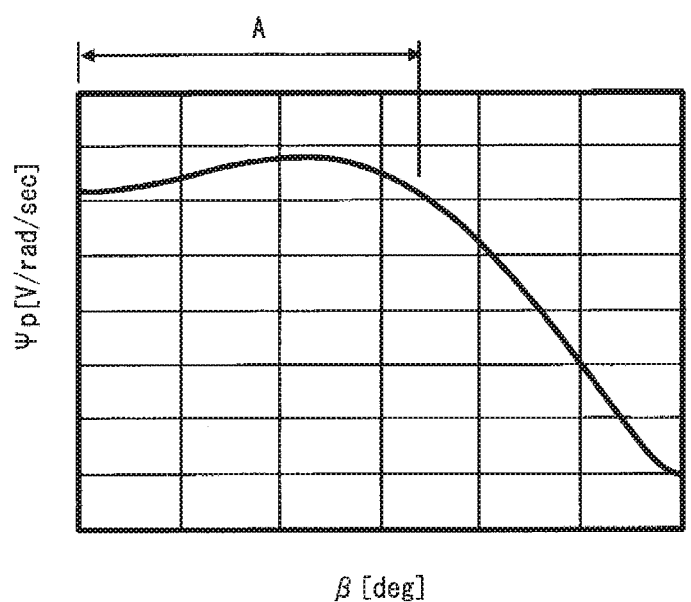
FIG. 10 is a diagram for explaining a problem that may occur in a conventional motor control device, showing the relationship between current phase β and flux linkage Ψp when a current peak value is high.

FIG. 9 is a flowchart illustrating an example of the process for selecting the first rotor position determining unit 19 or the second rotor position determining unit 20, executed by the selecting unit 21. This flowchart starts in response to the startup completion signal output from the startup processing unit 11.

In step S1, the first rotor position determining unit 19 is selected. That is, in the present embodiment, the selecting unit 21 first selects the first rotor position determining unit 19 when the startup of the synchronous motor 2 is completed. This is because phase current peak value Ip is usually low immediately after the completion of startup of the synchronous motor 2, and this allows the first rotor position determining unit 19 that uses the data table TA to stably determine rotor position θm.

In step S2, phase current peak value Ip and first induced voltage phase γ1 are read. Phase current peak value Ip read in this step is phase current peak value Ip which is most recently determined by the phase-current-peak-value-and-electrical-angle determining unit 16, and first induced voltage phase γ1 read in this step is first induced voltage phase γ1 which is most recently selected by first rotor position determining unit 19.

In step S3, it is determined whether phase current peak value Ip is greater than or equal to first threshold TH1. When phase current peak value Ip is greater than or equal to first threshold TH1, the process proceeds to step S4, whereas when phase current peak value Ip is less than first threshold TH1, the process returns to step S2. In the present embodiment, first threshold TH1 may be set to any value of 30 A or less.

Here, phase current peak value Ip compared with first threshold TH1 in step S3 is typically phase current peak value Ip which is read in step S2, that is, phase current peak value Ip which is most recently determined by the phase-current-peak-value-and-electrical-angle determining unit 16. However, the present invention is not limited thereto, and an average value (arithmetic average value, weighted average value) or a latest moving average value obtained from latest or previous phase current peak values Ip by the phase-current-peak-value-and-electrical-angle determining unit 16 may be used for phase current peak value Ip compared with first threshold TH1.

In step S4, it is determined whether first induced voltage phase γ1 is greater than or equal to second threshold TH2. When first induced voltage phase γ1 is greater than or equal to second threshold TH2, the process proceeds to step S5, whereas when first induced voltage phase γ1 is less than second threshold TH2, the process returns to step S2. In the present embodiment, second threshold TH2 is set to any value (for example, 70 degrees) in a range from the second predetermined value (55 degrees) to the first predetermined value (85 degrees).

Here, first induced voltage phase γ1 compared with second threshold TH2 in step S4 is typically first induced voltage phase γ1 which is read in step S2, that is, first induced voltage phase γ1 which is most recently selected by the first rotor position determining unit 19. However, the present invention is not limited thereto, and an average value (arithmetic average value, weighted average value) or a latest moving average value obtained from latest or previous first induced voltage phases γ1 by the first rotor position determining unit 19 may be used for first induced voltage phase γ1 compared with second threshold TH2.

In step S5, the second rotor position determining unit 20 is selected. That is, the selecting unit 21 selects the second rotor position determining unit 20, in place of the first rotor position determining unit 19, so that the determining unit for determining rotor position θm is switched from the first rotor position determining unit 19 to the second rotor position determining unit 20.

In step S6, phase current peak value Ip and second induced voltage phase γ2 are read. Phase current peak value Ip read in this step is phase current peak value Ip which is most recently determined by the phase-current-peak-value-and-electrical-angle determining unit 16, and second induced voltage phase γ2 read in this step is second induced voltage phase γ2 which is most recently selected by second rotor position determining unit 20.

In step S7, similarly to step S3, it is determined whether phase current peak value Ip is greater than or equal to first threshold TH1. When phase current peak value Ip is greater than or equal to first threshold TH1, the process proceeds to step S8. On the other hand, when phase current peak value Ip is less than first threshold TH1, the process returns to step S1, and the first rotor position determining unit 19 is selected. That is, the selecting unit 21 selects the first rotor position determining unit 19, in place of the second rotor position determining unit 20, so that the determining unit for determining rotor position θm is switched from the second rotor position determining unit 20 to the first rotor position determining unit 19.

Here, phase current peak value Ip compared with first threshold TH1 in step S7 is typically phase current peak value Ip which is read in step S6, that is, phase current peak value Ip which is most recently determined by the phase-current-peak-value-and-electrical-angle determining unit 16. However, the present invention is not limited thereto, and an average value (arithmetic average value, weighted average value) or a latest moving average value obtained from latest or previous phase current peak values Ip by the phase-current-peak-value-and-electrical-angle determining unit 16 may be used for phase current peak value Ip compared with threshold TH1 for current peak value.

In step S8, it is determined whether second induced voltage phase γ2 is greater than or equal to second threshold TH2. When second induced voltage phase γ2 is greater than or equal to second threshold TH2, the process returns to step S6. That is, the state in which the second rotor position determining unit 20 is selected continues. On the other hand, when second induced voltage phase γ2 is less than second threshold TH2, the process returns to step S1. That is, the selecting unit 21 selects the first rotor position determining unit 19, in place of the second rotor position determining unit 20, so that the determining unit for determining rotor position θm is switched from the second rotor position determining unit 20 to the first rotor position determining unit 19.

Here, second induced voltage phase γ2 compared with second threshold TH2 in step S8 is typically second induced voltage phase γ2 which is read in step S6, that is, second induced voltage phase γ2 which is most recently selected by the second rotor position determining unit 20. However, the present invention is not limited thereto, and an average value (arithmetic average value, weighted average value) or a latest moving average value obtained from latest or previous second induced voltage phases γ2 by the second rotor position determining unit 20 may be used for second induced voltage phase γ2 compared with threshold THγ for induced voltage phase.

Thus, in the present embodiment, the selecting unit 21 is configured to select the first rotor position determining unit 19 or the second rotor position determining unit 20, based on phase current peak value Ip and induced voltage phase γ (first induced voltage phase γ1, second induced voltage phase γ2). Specifically, after selecting the first rotor position determining unit 19, the selecting unit 21 selects the second rotor position determining unit 20, in place of the first rotor position determining unit 19, when phase current peak value Ip is greater than or equal to first threshold TH1, and first induced voltage phase γ1 is greater than or equal to second threshold TH2. Furthermore, after selecting the second rotor position determining unit 20, the selecting unit 21 selects the first rotor position determining unit 19, in place of the second rotor position determining unit 20, when phase current peak value Ip is less than first threshold TH1 or second induced voltage phase γ2 is less than second threshold TH2.

Thus, selection of the first rotor position determining unit or the second rotor position determining unit, in particular, switching from the first rotor position determining unit 19 to the second rotor position determining unit 20 and switching from the second rotor position determining unit 20 to the first rotor position determining unit 19 are appropriately performed, so that it is possible to prevent obtaining erroneous rotor position θm. This provides a stable and accurate determination of rotor position θm in both the normal-control region and the flux-weakening-control region, so that it is possible to stably control the synchronous motor 2 by the motor control device 1.

Furthermore, in the present embodiment, the selecting unit 21 is configured to select the first rotor position determining unit 19 when receiving the start completion signal output from the startup processing unit 11, that is, when startup of the synchronous motor 2 is completed. Therefore, it is possible to rapidly shift from the startup process to the normal control that is performed based on the rotor position θm.

In addition, in the foregoing embodiment, the selecting unit 21 is configured to select the first rotor position determining unit 19 when receiving the startup completion signal output from the startup processing unit 11. However, the present invention is not limited thereto. The selecting unit 21 may be configured to select the first rotor position determining unit 19 when the synchronous motor 2 starts up. In this case, the startup processing unit 11 executes the startup process of the synchronous motor 2 when receiving the operation command output from the exterior while the synchronous motor 2 is stopped, and the startup processing unit 11 outputs a startup activating signal to the selecting unit 21. The selecting unit 21 is configured to then start the selecting process, shown in FIG. 9, when receiving the startup activating signal.

Although the embodiment and modifications of the present invention have been described in the foregoing, the present invention is not limited thereto, and further modifications and changes can be made based on the technical concept of the present invention.

REFERENCE SYMBOL LIST

1 Motor control device
2 Synchronous motor
3 Inverter
11 Startup processing unit
12 Rotation control unit
13 Inverter driving unit
14 Phase current determining unit (current determining unit)
15 Applied voltage determining unit
16 Phase-current-peak-value-and-electrical-angle determining unit (current-peak-value-and-electrical-angle determining unit)
17 Induced-voltage-peak-value-and-electrical-angle determining unit
18 Flux linkage determining unit
19 First rotor position determining unit
20 Second rotor position determining unit
21 Selecting unit

The invention claimed is:

1. A motor control device comprising:
a current determining unit that determines a current flowing through a stator coil of a synchronous motor;
an applied voltage determining unit that determines an applied voltage applied to the stator coil;
a current-peak-value-and-electrical-angle determining unit that determines a current peak value and a current electrical angle based on a current determined by the current determining unit;
an induced-voltage-peak-value-and-electrical-angle determining unit that determines an induced voltage peak value and an induced voltage electrical angle based on the current determined by the current determining unit and an applied voltage determined by the applied voltage determining unit;
a flux linkage determining unit that determines a flux linkage of a rotor of the synchronous motor based on the induced voltage peak value and a rotational speed of the synchronous motor;
a first rotor position determining unit that determines a rotor position of the synchronous motor based on the induced voltage electrical angle, and a first induced voltage phase obtained from the current peak value and a difference between the induced voltage electrical angle and the current electrical angle;
a second rotor position determining unit that determines a rotor position of the synchronous motor based on the induced voltage electrical angle, and a second induced voltage phase obtained from the flux linkage and the current peak value; and
a selecting unit that selects the first rotor position determining unit or the second rotor position determining unit, based on the current peak value, and the first induced voltage phase or the second induced voltage phase.

2. The motor control device according to claim 1, wherein, after selecting the first rotor position determining unit, the selecting unit selects the second rotor position determining unit, in place of the first rotor position determining unit, when the current peak value is greater than or equal to a threshold for current peak value, and the first induced voltage phase is greater than or equal to a threshold for induced voltage phase.

3. The motor control device according to claim 2, wherein, after selecting the second rotor position determining unit, the selecting unit selects the first rotor position determining unit, in place of the second rotor position determining unit, when the current peak value is less than the threshold for current peak value, and the second induced voltage phase is less than the threshold for induced voltage phase.

4. The motor control device according to claim 3, wherein the selecting unit selects the first rotor position determining unit, when the synchronous motor starts up or when startup of the synchronous motor is completed.

5. The motor control device according to claim 2, wherein the selecting unit selects the first rotor position determining unit, when the synchronous motor starts up or when startup of the synchronous motor is completed.

6. The motor control device according to claim 1, wherein the selecting unit selects the first rotor position determining unit, when the synchronous motor starts up or when startup of the synchronous motor is completed.

* * * * *